June 8, 1937.  H. C. EDWARDS  2,083,323

INTERNAL COMBUSTION ENGINE

Filed Feb. 25, 1931

Inventor
HERBERT C. EDWARDS.
By
Attorney

Patented June 8, 1937

2,083,323

UNITED STATES PATENT OFFICE 2,083,323

INTERNAL COMBUSTION ENGINE

Herbert C. Edwards, Detroit, Mich., assignor to Packard Motor Car Company, Detroit, Mich., a corporation of Michigan Application February 25, 1931, Serial No. 518,104

6 Claims. (Cl. 123—32)

This invention relates to internal combustion engines and more particularly to engines of the compression-ignition type.

In Diesel engines of the type in which air and liquid fuel are introduced separately into the combustion chambers in the cylinders and mixed therein, the power output depends chiefly upon the intermingling of the fuel with the air and the compression ratio. In order, therefore, to obtain the best results, many forms of combustion chambers have been proposed and the fuel and air have been introduced in various relations with each other and with relation to the cylinders.

One method commonly employed to secure an intermingling of the fuel and air is to introduce the air into the cylinders in a manner such that it will rotate therein and continue to rotate during compression so that the fuel sprayed therein through the cylinder wall will penetrate to the axis thereof and will thus take up the proper oxygen to support combustion.

It is an object of this invention to form the cylinder head and the piston of a Diesel engine so that they offer a minimum resistance to rotation of the air and the mixture and cooperate to form a final combustion chamber which is of small cubical contents.

Another object of the invention is to form the cylinder head and the piston of a Diesel engine with complementary curved surfaces which form a combustion chamber in the cylinder of materially smaller diameter than the cylinder and in open relation with the fuel injection device.

A further object of the invention is to aid the efficiency of a Diesel engine, in which combustion occurs within the cylinders, through the provision of wall surfaces on the head and piston in the form of spherical segments which form the combustion chamber partially across the cylinder.

Other objects of the invention will appear from the following description taken in connection with the drawing, which forms a part of this specification, and in which.

Figure 1:
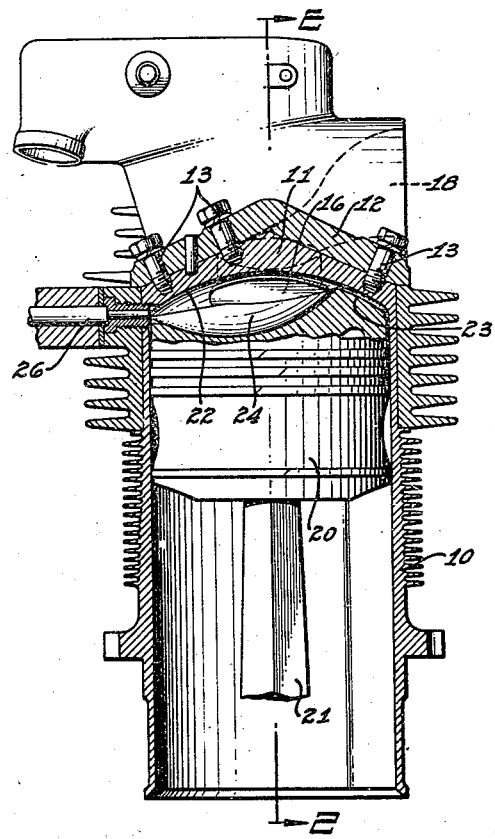
Fig. 1 is a vertical sectional view of a cylinder and associated piston incorporating my invention, taken on line 1—1 of Fig. 2.
Figure 2:
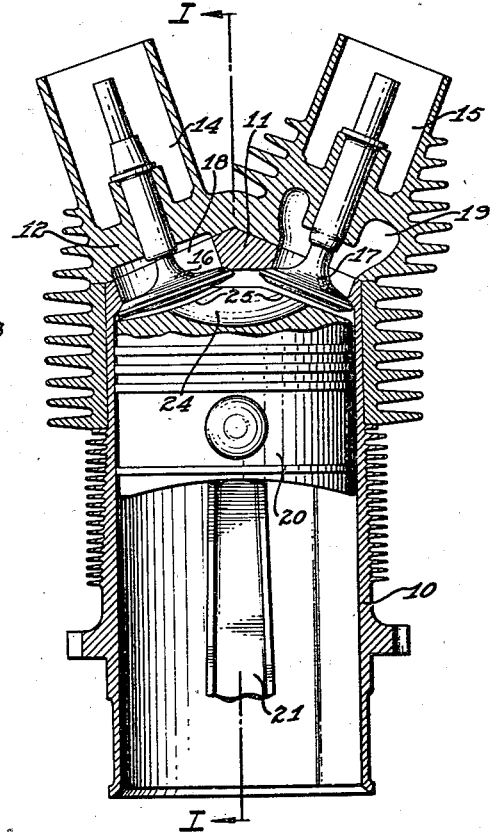
Fig. 2 is another vertical sectional view of the cylinder and piston, taken on line 2—2 of Fig. 1.
Figure 3:
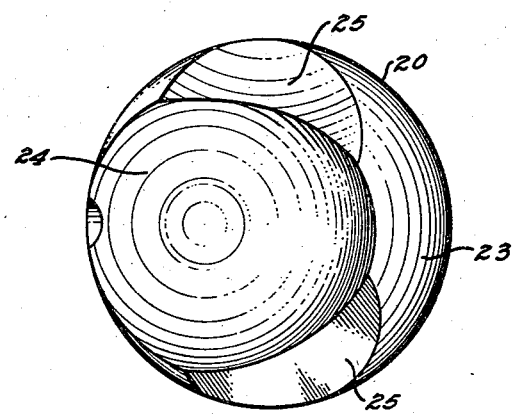
Fig. 3 is an end view of the piston removed from the cylinder.

Referring to the drawing by characters of reference, 10 indicates a Diesel engine cylinder of the air-cooled type having an integral head 11. The cylinder and head are preferably formed of steel so that a relatively thin wall structure can be employed which has strength enough to withstand the high pressures developed in a Diesel type of engine in which the mixture is ignited through compression pressure.

A dome 12 is secured upon the head by means of bolts 13, and is formed with a pair of housings 14 and 15 for the reception of mechanism to be associated with the stems of the valves 16 and 17. An air inlet passage 18 extends through the dome and head and the inner end thereof is controlled by the valve 16, while an exhaust passage 19 extends through the dome and head and is controlled by the valve 17. It will be understood that the engine illustrated is of the four-cycle type, however this type of cycle is illustrative only.

Within the cylinder is arranged a piston 20 with which the conventional connecting rod 21 is pivotally secured. The air inlet passage 18 is in the form of a venturi as shown in dotted lines in Fig. 1, to speed up the air moved therethrough by the piston during the suction stroke, and it is arranged tangentially of the inner wall of the cylinder and at an angle to the cylinder axis. This form of air inlet passage causes rotation of the air charge as a mass in the cylinder which continues all during the compression stroke, and for a more detailed description of such a type of air inlet, reference may be had to Reissue Patent No. 17,775, issued August 19, 1930, to Hermann I. A. Dorner.

In order to secure high efficiency with an engine of the class described, I propose to form the piston end and the cylinder head wall in a manner to provide high compression ratio without valve interference, to present minimum resistance to the charge rotation, and a combustion chamber which extends only part way across the cylinder.

To this end the inner wall 22 of the head is finished as a spherical segment which is concave relative to the interior of the cylinder. The end wall 23 of the piston is primarily formed as a spherical segment which is complementary to the wall 22 of the head, and the connecting rod is so arranged that such piston surface 23 will closely approach the head surface 22 in top center position. In order to permit such close approach of the piston to the head, the spherical segmental wall is finished with substantially flat surfaces 25 coaxial with the valve heads and in a parallel plane therewith so that sufficient valve clearance is thereby permitted. The piston end is also formed with a depression or pocket 24 which extends only part way thereacross and intersects an edge portion thereof. The piston wall defining the pocket is in the form of a spherical segment and extends in a direction to form a spheroidal combustion space with the adjacent portion of the cylinder head. The deepest portion of the pocket is offset from the center of the cylinder and the axis thereof extends at an angle to the piston axis so that the combustion chamber is spheroidal in form and at one side of the piston.

The device 26, for injecting liquid fuel under a high pressure, extends through the cylinder wall in a relation midway of the pocket, so that fuel can be sprayed centrally across the pocket when it is at top center position. It will also be noted that the pocket is longer in the direction of the liquid fuel injection and that in this respect it extends beyond the center of the piston. It will be understood that the pocket can be formed of different depths, and that the end walls of the combustion chamber could be reversed and still achieve substantially the same result attained with the illustrated preferred embodiment. The space between the complementary curved faces of the piston head and the piston is so narrow that it is a dead air space in which no flame propagation takes place.

It will be seen that the curved head wall 22 offers a minimum resistance to the rotation of the air charge and the mixture in the cylinder. The curved surfaces of the piston end likewise offer a minimum resistance to the rotation of the air charges in the cylinder. When the fuel is injected into the cylinder, the air is contained in the space bounded substantially by the spherical wall of the pocket and the adjacent spherical wall of the head, so that the final compression of the mixture and the explosion takes place between such oppositely curved surfaces and such defined combustion chamber extends angularly across only a portion of the cylinder. The compression ratio is therefore very high, and the rotation of the mixture is substantially unretarded by the surfaces and is speeded up due to the more confined area in which it rotates so that flame propagation is much faster than if the chamber extended entirely across the cylinder. Due to the reduced length of the combustion chamber, the injection device can project fuel substantially entirely across the chamber so that in a half revolution of the compressed air, the fuel will be thoroughly intermingled therewith. Due to these advantages the efficiency of the engine is greatly increased.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an engine, a cylinder in which air charges are introduced in a manner causing their rotation, a cylinder head having the entire inner surface in the form of a spherical segment, a piston in the cylinder having an end formed in part complementary with the inner surface of the head and adapted to extend into the head recess and closely approach the inner surface of the head in top center position, said piston having a pocket intersecting an edge portion of the piston end, said pocket and the inner surface of said head forming a spheroidal combustion chamber, and a fuel injection device associated with the cylinder to project fuel into the combustion chamber.

2. In an engine, a cylinder in which air charges are introduced to cause their rotation, a cylinder head having an inner surface in the form of a spherical segment and with angularly disposed valved ports therethrough, a piston in the cylinder having an end formed complementary with the inner head surface and with a pair of substantially flat surfaces aligning with the ports to provide clearance for the valves, said piston end having a pocket extending radially intermediate the flatted portions, said pocket being longer in a radial direction between the flatted surfaces and forming a spheroidal combustion chamber with the inner surface of the head, and an injection device associated with the cylinder to project liquid fuel into the combustion space in the direction of the longest dimension.

3. In a compression-ignition engine, a cylinder, a cylinder head having its entire interior surface in the form of a spherical segment and an air inlet therethrough extending at an angle to the cylinder axis and tangential to the inner perimeter of the cylinder, a piston in the cylinder having a minor portion of its head end in the form of a spherical segment complementary to the inner surface of the head and projecting into the interior of the head at the end of the compression stroke, said piston head end having a pocket arranged off center in the major portion thereof and in the form of a segment of a sphere, air entering the cylinder rotating first spirally and then normal to the cylinder axis during compression by the piston, and an injection device extending into the cylinder in relation to spray fuel across the longest dimension of the pocket when the piston is adjacent top center position.

4. In an engine, a cylinder in which air charges are introduced so that they will rotate normal to the cylinder axis during compression, the cylinder head having a recess with the entire inner surface in the form of a spherical segment, a piston in the cylinder having the head end adapted to project into the spherical recess in the cylinder head, said piston head end having an offset pocket therein and in the form of a spherical segment, the axis of the pocket segment being angularly disposed relative to the piston axis, said pocket and the head wall adjacent thereto forming generally a spheroidal combustion chamber, and a fuel injection device associated with the cylinder to project fuel into said spheroidal combustion chamber.

5. In an engine, a cylinder having a head with the inner wall concave forming a recess, said head having an air inlet port therein opening into the recess and arranged to induce rotation of air charges in the cylinder, a piston in the cylinder having a convex head end complementary to the inner surface of the head and adapted to project into the head recess at top center position, a concave pocket in the head end of the piston and at one side thereof, said pocket and the adjacent inner surface of the head forming generally a spheroidal combustion chamber, and a fuel injection device associated with the cylinder to project liquid fuel into the combustion chamber formed by the piston and the head.

6. In an engine, a cylinder in which air charges are introduced in a manner causing their rotation, a cylinder head having the entire inner surface in the form of a spherical segment, a piston in the cylinder having a head end formed in part complementary with the inner surface of the cylinder head and adapted to closely approach the same in its movement, said piston having a pocket in the head end, said pocket and the inner surface of the cylinder head forming a spheroidal combustion chamber, and a fuel injection device associated with said cylinder to project fuel into the combustion chamber.

HERBERT C. EDWARDS.